United States Patent [19]

Speicher

[11] Patent Number: 5,507,594

[45] Date of Patent: Apr. 16, 1996

[54] METHOD AND APPARATUS FOR CONSTRUCTING AN ARTIFICIAL REEF

[76] Inventor: Donald E. Speicher, 43 Hickory La., Leola, Pa. 17540

[21] Appl. No.: 237,887

[22] Filed: May 4, 1994

[51] Int. Cl.[6] .................................................. F02B 3/04
[52] U.S. Cl. ................................ 405/25; 405/21; 405/19
[58] Field of Search ................................ 405/19, 20, 21, 405/23, 25, 30, 31, 33, 34, 35

[56] References Cited

U.S. PATENT DOCUMENTS

| | | |
|---|---|---|
| 1,768,309 | 6/1930 | Dark . |
| 2,069,715 | 2/1937 | Arpin . |
| 2,454,292 | 11/1948 | Pickett . |
| 2,502,757 | 4/1950 | Shearer . |
| 2,674,856 | 4/1954 | Loucker . |
| 4,154,550 | 5/1979 | Larsen ........................................ 405/74 |
| 4,171,124 | 10/1979 | Larsen ........................................ 405/25 |
| 4,958,956 | 9/1990 | Tanaka et al. ............................. 405/23 |
| 5,102,257 | 4/1992 | Creter ........................................ 405/25 |
| 5,215,406 | 6/1993 | Hudson ...................................... 405/25 |

*Primary Examiner*—Ramon S. Britts
*Assistant Examiner*—Frederick L. Lagman
*Attorney, Agent, or Firm*—Hartman Underhill & Brubaker

[57] ABSTRACT

Apparatus and method for constructing an artificial ocean reef for use below the ocean surface to serve as an offshore breakwater for inbound waves and thereby prevent beach erosion. The reef has a plurality of adjacent sections, each of which comprises an arched wall having a series of side-by-side transverse concrete blocks, and flexible interconnections between the blocks at adjacent lateral edges to provide a generally smooth outer surface. The arched wall sections are each formed above the water surface on a barge or the like and then submerged with a shoreward side having a shoreward end resting on the floor of the ocean and a seaward side with a seaward end resting on the floor of the ocean outwardly from the shoreward end to present the smooth outer surface on the seaward side of the wall to incoming waves. Adjacent sections are secured together to form a continuous barrier aligned with the shore line of the beach being protected.

16 Claims, 5 Drawing Sheets

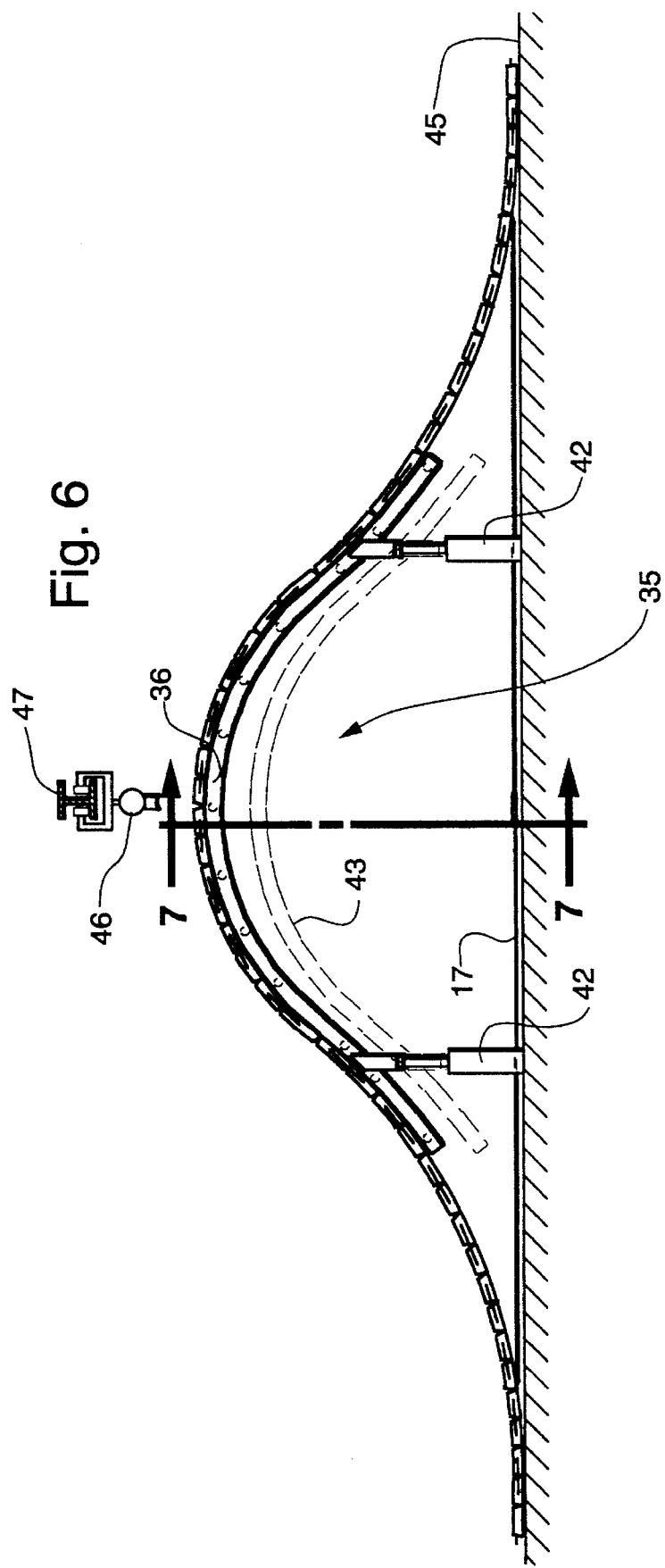

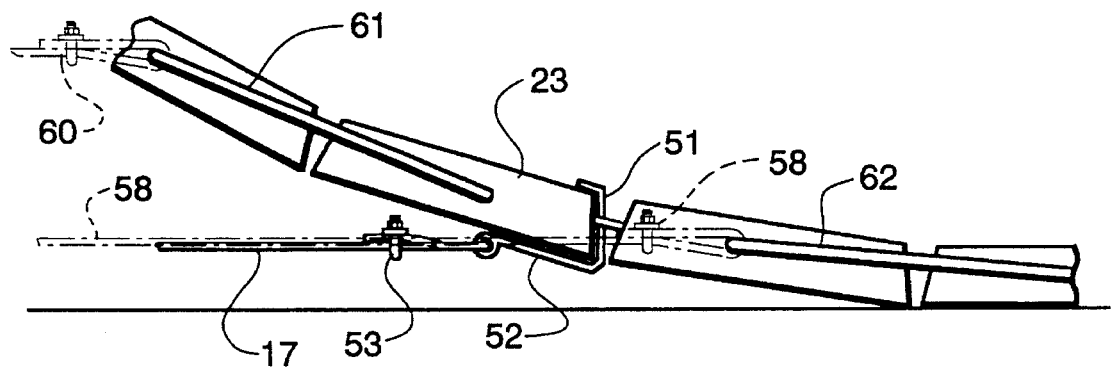
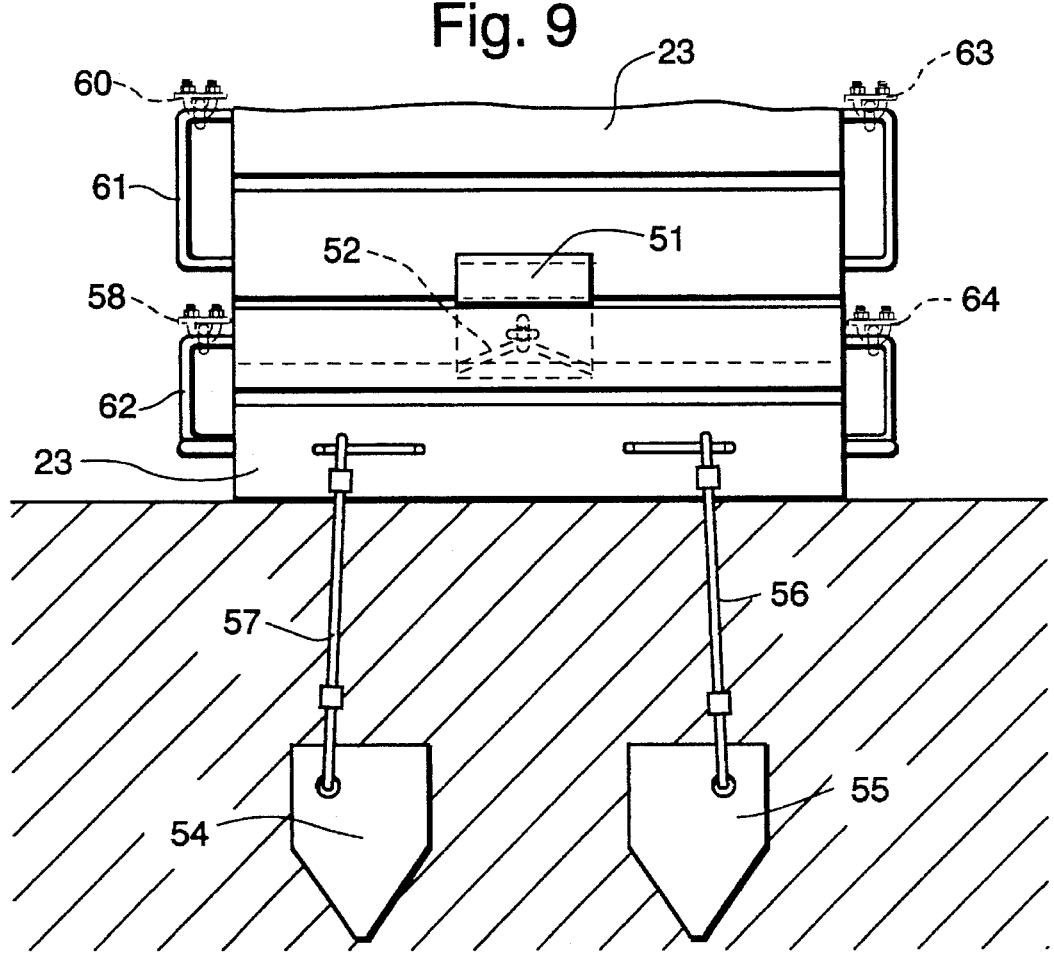

METHOD AND APPARATUS FOR CONSTRUCTING AN ARTIFICIAL REEF

FIELD OF THE INVENTION

This invention relates generally to the field of artificial ocean reefs and more particularly to a method and apparatus for forming an artificial reef for use below the ocean water surface to prevent beach erosion.

BACKGROUND OF THE INVENTION

Various types of prior art artificial reef systems have been placed on the ocean floor in the vicinity of the shore to prevent beach erosion. In these known systems a principle purpose is to provide a subsurface breakwater structure for deflecting water currents and thereby reduce the damaging force of the waves as they impact on the beach. Another purpose is to provide a structure that has the characteristics of a natural reef and thus is attractive and protective of fish and aquatic organisms. In the case of a breakwater, waves passing over the subsurface structure break a sufficient distance off shore to reduce the energy carried by the waves as they continue on toward the shore. As a result, the speed is diminished and sand carried by the water is permitted to be deposited on the beach rather than being removed by undertow, i.e., the reverse underwater current caused by receding waves.

Examples of prior art artificial reefs are shown in U.S. Pat. No. 5,102,257, issued on Apr. 2, 1992 to Richard E. Creter, and U.S. Pat. No. 2,069,715, issued on Feb. 2, 1937 to John B. Arpin. These reefs utilize reinforced concrete modules having a triangular prismatic shape, placed in side-by-side fashion and coupled together to form a submerged breakwater. The Creter reef module weighs about 12 tons when constructed to the dimensions disclosed in the patent. Other similarly shaped artificial reef modules constructed from reinforced concrete have been known to weigh 20 tons.

Another known arrangement for providing an artificial reef is the use of a pliant bag filled with water and submerged off shore, as disclosed in U.S. Pat. No. 4,958,956, issued Sep. 25, 1990 in the name of Massahiro Tanaka, et al. Because the bag is resilient it deforms as waves pass over it and part of the wave energy is dissipated which in turn is claimed to reduce wave size.

An artificial ocean reef utilizing modules with a general dome shaped configuration on a steel reinforced slab is shown in U.S. Pat. No. 5,215,406, issued Jun. 1, 1993 in the name of J. Harold Hudson. These modules in the preferred embodiment are formed from concrete and have a hemispherical shape with access ports for creating water flow to mimic a natural reef.

The use of corrugated plates made of flexible material such as polyethylene held on frames suitably placed on the ocean floor is also disclosed in the prior art. U.S. Pat. No. 4,171,174, issued Oct. 16, 1979 in the name of Ole J. F. Larsen shows several embodiments of artificial reefs in which this principle is embraced.

Many of the known artificial reefs used as submerged breakwaters to protect against beach erosion comprise structure that is difficult and costly to fabricate, transport and install. For example, in one application a series of prefabricated concrete modules are used, each of which weighs as much as 20 tons. This massive structure not only contributes to the cost but also requires significant amounts of labor in the production as well as the installation of such modules in the submerged operational environment on the ocean floor. Bulky cumbersome objects of this nature are inherently difficult to handle and transport as well as maintain due to the magnitude of their weight. These problems become even more pronounced in view of the undersea water currents usually prevalent in the off shore environs in which breakwaters are installed and maintained.

SUMMARY OF THE INVENTION

A principle object of the present invention is to provide a durable artificial submerged ocean reef which is cost effective, lends itself to quick and easy construction and is conveniently maintainable.

It is also an object of the present invention to provide a method of installing a durable artificial submerged ocean reef in a cost effective manner with a minimum requirement for subsurface work.

In pursuance of these and other important objects the present invention contemplates a reef having a plurality of adjacent sections each of which comprises an arched wall formed by a series of side-by-side transverse concrete blocks, and flexible means for interconnecting the blocks at adjacent lateral edges to provide a generally smooth outer surface. The wall has a shoreward side with a shoreward end resting on the floor of the ocean and a seaward side with a seaward end resting on the floor of the ocean outwardly from the shoreward end to present the generally smooth surface on the seaward side to the incoming waves.

A method for preventing beach erosion is also contemplated comprising the steps of constructing a flat flexible wall section from a series of side-by-side transverse concrete blocks interconnected by flexible means at adjacent lateral edges, forming the wall into an arch shaped structure having a curved top portion and generally smooth outer surfaces, and placing the arch shaped structure on the ocean floor with the top portion beneath the surface of the water at low tide and with the transverse concrete blocks generally aligned with the shore line of the beach being protected from erosion to present a submerged barrier to the force components of waves traveling toward the shore.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

BRIEF DESCRIPTION OF THE DRAWINGS

FIG. 6 is a diagrammatical side elevational view similar to FIG. 1 and further including the installation form.

FIG. 8 is a partial side elevational view showing in detail the cable fastener assembly.

FIG. 9 is a view taken in the direction of arrows 9—9 in FIG. 1.

DESCRIPTION OF THE PREFERRED EMBODIMENT

Figure 1:
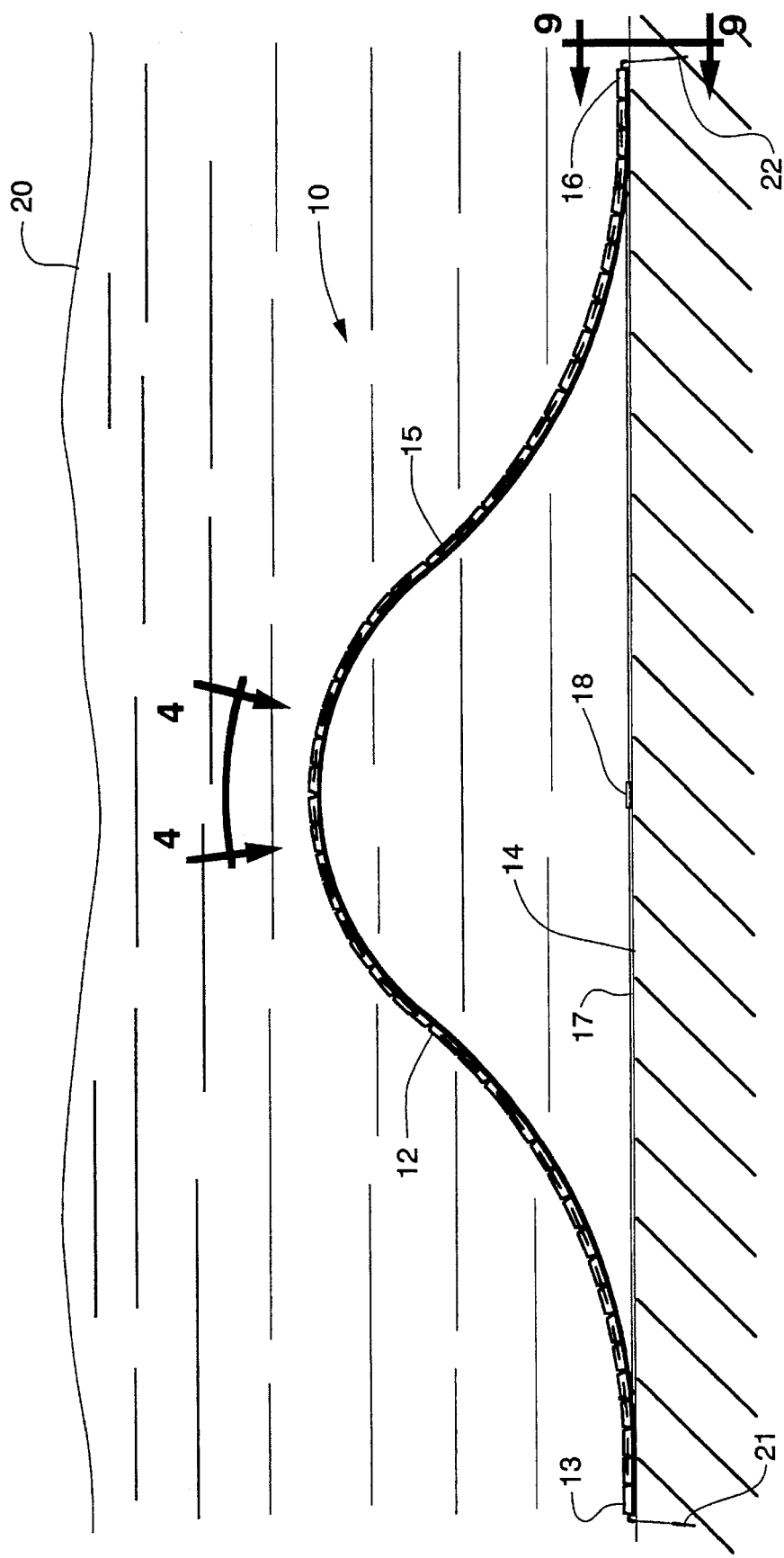
FIG. 1 is a diagrammatic side elevational view of the artificial reef structure of the present invention.

Referring now to the drawings, FIG. 1 shows an artificial ocean reef, generally designated by reference numeral 10, depicting in general the principles of the present invention. Reef 10 comprises one or more arched wall sections, each of which has a shoreward side 12 with a shoreward end 13 resting on the ocean floor 14 and a similar seaward side 15 with a seaward end 16 also resting on the ocean floor. The reef 10, which is substantially symmetrical, is retained in its unique general bell-shaped configuration by a cable 17 secured thereto in the vicinity of its ends. A turnbuckle 18 is utilized to vary the length of the expanse of cable 17 to precisely determine the height of the arched wall.

In an embodiment of the present invention that has been tested in a simulated environment, commonly referred to as a wave tank, it was determined that for optimal results the top of the arched wall should be approximately 10 feet above the ocean floor and at a minimum of 5 feet below the surface of the water 20 at mean low tide. Completing the artificial ocean reef 10 shown in FIG. 1 is optional anchoring means 21 and 22. The linear dimension of each arched wall section 11 is 50 feet and for convenience of handling and transport is constructed from two 25 foot segments attached together in the vicinity of the top of the arch to provide an overall length of approximately 44 feet; however, a single 50 foot section would suffice.

Figure 2:
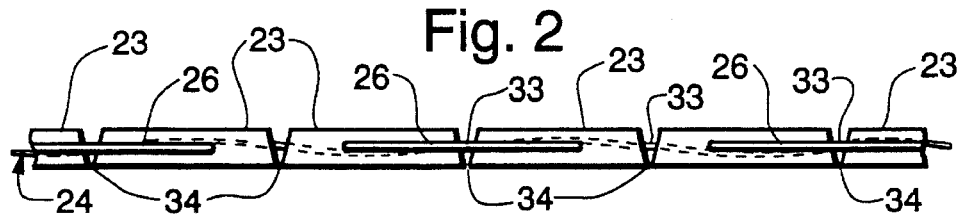
FIG. 2 is a partial side elevational view of a wall segment used to form the artificial reef structure shown in FIG. 1.
Figure 3:
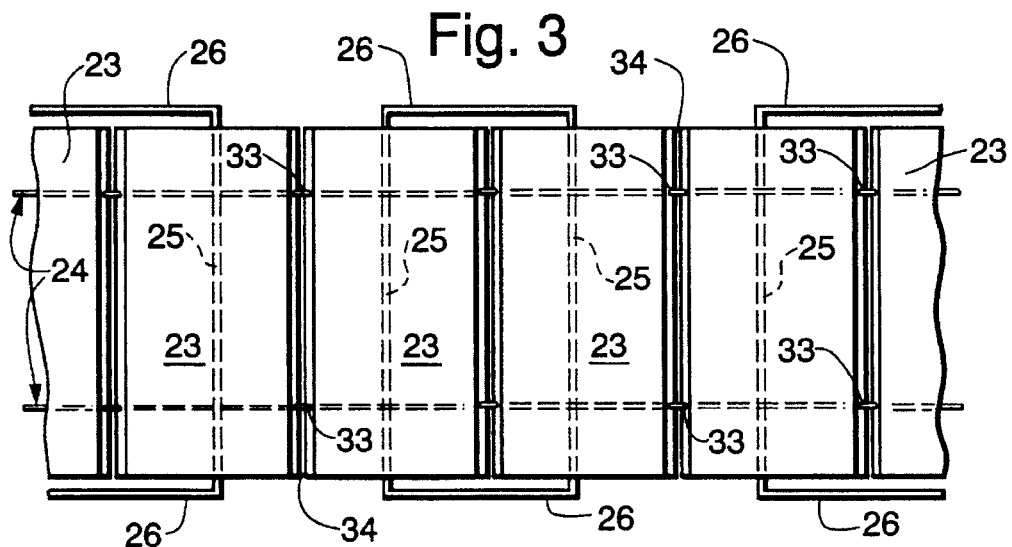
FIG. 3 is a plan view of the of the partial portion of the wall segment shown in FIG. 2.

FIG. 2 shows a portion of a wall segment in its preformed flat shape. These segments are constructed from a series of identical reinforced precast concrete blocks 23, about 4 feet long and 2 feet wide with a thickness of approximately 3 inches. The blocks 23 are attached together by reinforcing wires 24 which are embedded during the hardening process and extend from end to end of each segment with sufficient space between the lateral edges of adjacent blocks to permit limited flexure of the wall. Reinforcing wires 25 also extend transversely of the blocks along a continuous rectangular path forming interconnecting side loops 26 between neighboring blocks. These wall segments are similar in configuration to revetment mats, commonly used on freshwater river banks and canals to afford protection against erosion. U.S. Pat. No. 2,674,856, issued Apr. 13, 1954 in the name of Frank I. Louckes discloses a mat of this nature and is hereby incorporated by reference to the extent that it is a general showing of a standard revetment mat.

Figure 4:
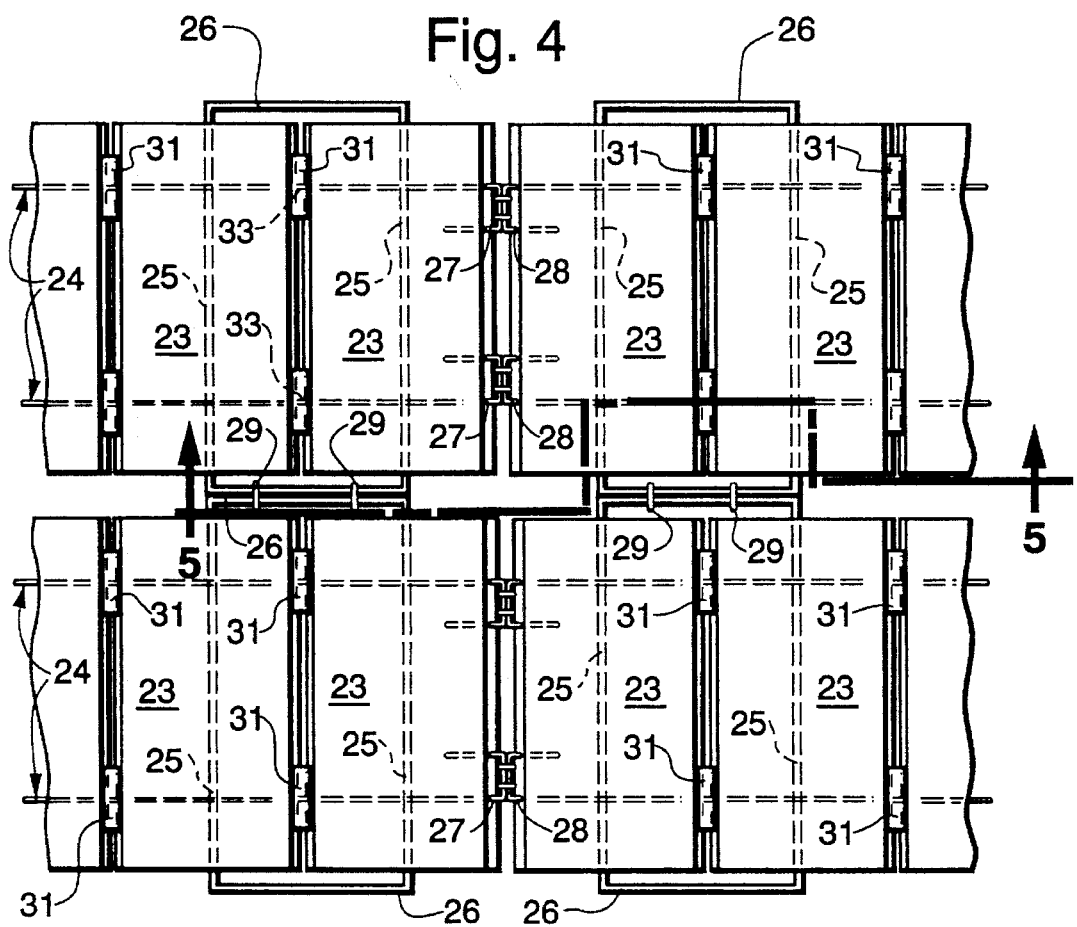
FIG. 4 is a view taken in the direction of arrows 4—4 in FIG. 1.
Figure 5:
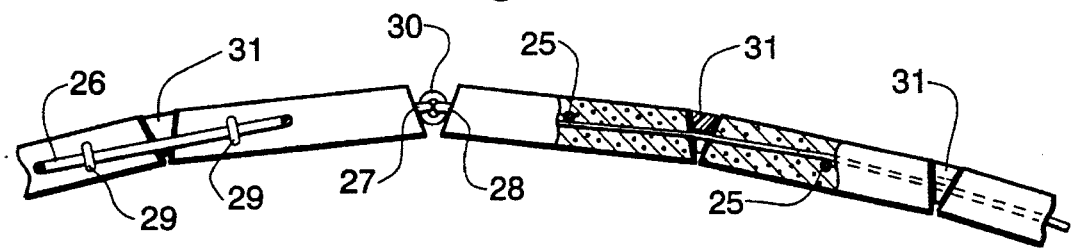
FIG. 5 is a view taken in the direction of arrows 5—5 in FIG. 4.

Turning now to FIG. 4, the top of the artificial ocean reef is shown in which portions of two arched wall sections are affixed in a side-by-side fashion via adjacent side loops 26 and securement means 29. Each section comprises two segments which are secured at their adjacent ends. End loops 27, 28, provided in reinforcing wire 24 for this purpose, are affixed together by appropriate securement means, similar to securement means 29, such as wire clamps 30, or the like, shown in FIG. 5.

Figure 5A:
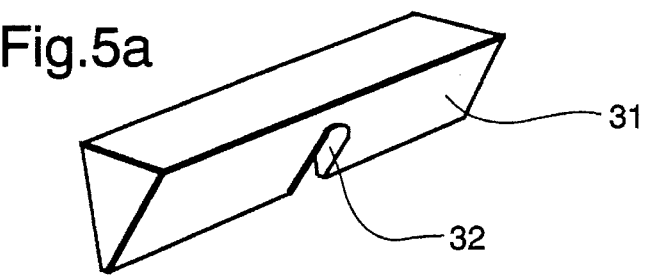
FIG. 5a is a perspective view of a spacer element described in the description set forth below.

Spacers 31, positioned in the beveled gaps between the lateral edges of adjacent blocks (see FIG. 5), are constructed from a plastic material adaptable to the salt water environment and pliable enough to provide a friction fit that will maintain the wall in its arched shape with a minimum amount of flexure. Each spacer, which is generally wedge shaped (see FIG. 5a), has an individual distinctive shape in that its particular shape requirement is based on the shape of the gap for which it is to conform. The gaps have varying shapes due to the geometry of the arched wall. This permits all the blocks to be precast with the same dimensions. When the spacers are in place the arched wall section is permanently fixed in its bell shape by cable 17. Although the arched shape is referred to as a fixed structure, it is not completely unyielding. It has a certain minimal degree of flexibility which can be varied by the selective use of plastic spacers along its length, i.e., by omitting spacers in certain gaps. Nevertheless, in the preferred embodiment spacers are used in all gaps to maintain the unique shape and to prevent interaction between adjacent blocks that could result in fractures to the concrete. It should be further noted that spacers 31 are provided with a convenient slot 32 to receive the interconnecting segments 33 of wire 24 extending in the gaps 34 between adjacent edges of the blocks. This assures that the spacers will not shift transversely along the gaps.

Figure 7:
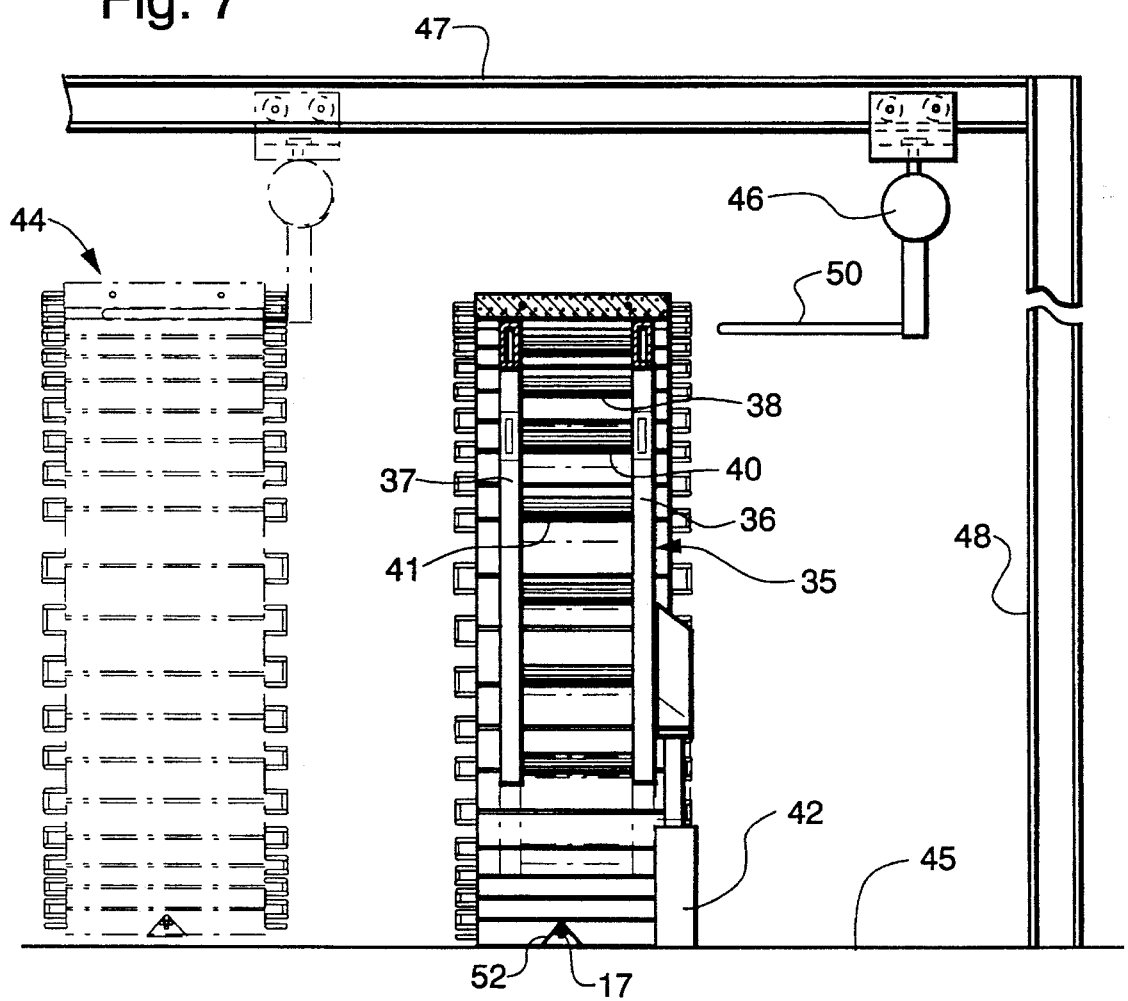
FIG. 7 is a view taken in the direction of arrows 7—7 in FIG. 6.

Each individual wall section is constructed above the ocean, either on shore or on the deck of a barge. FIGS. 6 and 7 show an installation form 35 having a pair of arch shaped forming members 36, 37 interconnected by a series of cross struts 38, 40. Forming members 36, 37 are mounted on a hydraulic lift assembly 42 that lowers installation form 35 after the wall section has been formed, i.e., after a complete set of spacers are in place and the wall is held rigid by cable 17 in its desired configuration. The lowered position of installation form 34 is shown by phantom outline 43. FIG. 7 shows a completed wall section in phantom outline 44 that has been moved to a remote position on the barge deck 45 by traveling crane assembly 46. Crane assembly 46 includes an overhead beam 47, extending from a vertical support 48, above the center of installation form 35. After an arched wall section is completed, the crane moves an extendible lift arm 50 to a support position in the center of the wall section. The installation form in then lowered by hydraulic lift assembly 42 leaving the formed wall section supported by lift arm 50 and free to be transported by the crane to a remote position such as the position shown by phantom outline 44. It should be noted that the installation form and hydraulic lift combination is constructed to provide clearance on one side to permit the cable to be transportable in an unobstructed manner away from the installation form, i.e., the hydraulic lift assembly 42 is supported on only one side. Extensible lift arm 50 is adaptable to extend outwardly and engage a plurality of formed wall sections for transport together after having been secured in a side-by-side fashion as shown in FIG. 4.

Although the cable can be connected to the wall by means of an eyebolt embedded in the appropriate block, FIG. 8 shows a formed cable fastener plate 51 that adapts for convenient coupling to any selected block during construction of the arched wall. Plate 51 (also shown in FIG. 9) is centrally located with a triangular leg 52 extending along the bottom surface of block 23 with cable 17 secured to the end thereof via cable clamp 53. FIGS. 8 and 9 are for illustrative purposes only and do not show spacers in the gaps between adjacent edges of the blocks. FIG. 9 also depicts conventional offset anchors 54, 55 secured to the end block 23 by anchor lines 56, 57.

In an alternative embodiment a plurality of cables could be utilized in the manner shown by phantom outline in FIG.

8 where cables 58, 60 are attached to end loops 61, 62. Similar cables 63, 64 are attached to the opposite side of the wall as shown in FIG. 9. If a plurality of cables are used in this manner, as opposed to a centrally located cable 17, the hydraulic lift means would be modified to support both sides of the installation form and would be disposed completely within the confines of the installed cables. This requires that the completed wall be lifted to a sufficient height by crane assembly 46 so that the wall clears the cables before moving transversely on overhead beam 47. In this situation the lift means design would be optimized to drive the installation form lower than shown in phantom in FIG. 6.

In operation, an artificial ocean reef is constructed by transporting a plurality of precast wall segments to an offshore location via a barge equipped with a crane and installation form of the type discussed above. Two segments are attached together to form a section. The section is either lifted onto or dragged over the installation form to take on the desired arched form of arch shaped forming members 36, 37 shown in FIGS. 6 and 7. Spacers are then inserted in the gaps with specially shaped spacers provided as required, such predetermined shapes being established by the gaps that take shape when the wall section is placed on the forming members. Cable 17 is then secured in place by using fastener plates 51 on appropriate blocks. The spacer (not shown) for the gap in which fastener 51 is placed will necessarily be inserted after the plate is in place. After the cable is snugly secured in its final position by use of turnbuckle 18, installation form 35 is dropped to the phantom position shown in FIG. 6 and the completed section is suspended on lift arm 50. Crane assembly 46 then transports the completed section from its position above the installation form to the position shown in phantom, at which time another section can be formed in a like manner. When the next formed section is completed, it is moved to a position adjacent the previously formed section, whereupon the two section are secured to each other via side loops 26, as shown in FIG. 4.

This process continues until a desired number of side-by-side arched wall sections are secured together on the barge. Crane assembly 46 is then employed to lower them into the ocean. Although there are practical limits on the number of sections that can be installed at one time, cranes are available with the capacity to handle several without overloading. Each section weighs about 6,800 pounds, i.e., 5 sections weigh approximately 10 tons. This is not an excessive amount in terms of commercially available cranes.

The depth of the water determines the location at which the sections will be installed on the ocean floor. A minimal amount of labor is then required by divers for accomplishing the relatively simple task of anchoring and securing the arched wall section to the previously installed sections if deemed necessary. The artificial reef constructed in this manner will follow the general contour of the shore line and have a stabilizing effect by deterring erosion.

Of the many implicit and explicit advantages of the artificial ocean reef of the present invention described above, one of the most important is the ease with which the reef is installed. Equally as important is the simplicity of the structure and the installation method which thereby has an important impact on the low initial cost as well as the low cost involved with continuing maintenance.

While preferred structure in which the principles of the present invention have been incorporated is shown, it is to be understood that the invention is not limited to such structure, but that, in fact, widely different means of varying scope and configuration may be employed in the practice of the invention.

Having thus described the invention, what is claimed is:

1. An artificial reef for use off shore beneath the ocean surface to protect a beach from erosion caused by incoming waves comprising an arched wall formed by a series of side by side transverse blocks, means interconnecting the blocks to allow flexible movement of the blocks relative to each other, said wall having a shoreward side with a shoreward end on the floor of the ocean and a seaward side and a seaward end also on the ocean floor, said shoreward and seaward sides and the extension of said blocks being generally parallel to each other and to the beach to be protected and the travel of waves toward the shore, said wall having a length transverse to the beach greater than the distance between said shoreward end and said seaward end whereby an arch is formed by said blocks between said ends, holding means connected between said shoreward side and said seaward side to maintain said transverse length of the wall, said reef having a space beneath the arch and above the sea bed open to water in the sea and the reef being located at such a distance off shore that the top of the arch is below the surface of the water and high enough above the sea bed to have an effect on waves passing over the wall to cause the waves to break to dissipate energy before the waves reach the shore.

2. An artificial ocean reef as set forth in claim 1 wherein said holding means comprises a cable.

3. An artificial reef as recited in claim 2 wherein a fastener plate is provided on each end of said cable to couple with any selected block of the arched wall shoreward end and seaward end, said cable holding said wall in its arched shape.

4. An artificial ocean reef as set forth in claim 1 wherein said transverse blocks are concrete and spaced from each other, and said flexible interconnecting means comprises a plurality of wire segments embedded in and spanning gaps between the lateral edges of adjacent blocks.

5. An artificial ocean reef as recited in claim 4 wherein said blocks have beveled edges to provide beveled gaps between two adjacent blocks, and wedge shaped spacers fitted into said gaps to hold said blocks in position relative to each other.

6. An artificial ocean reef as recited in claim 5 wherein said wedge shaped spacers are formed of plastic and of such size to have a friction fit in the gap between two blocks.

7. An artificial reef as recited in claim 1 wherein each block has a wire segment imbedded in and extending transverse to the extension of the wall, each wire projecting from each side edge of each block, and a wire connecting projecting ends of two adjacent blocks.

8. An artificial reef as recited in claim 7 where wire clamps are provided to connect the wire segments of one arched wall to the wire segments on an adjacent arched wall, whereby side by side arch walls are interconnected to form a continuous artificial reef on the ocean floor.

9. An artificial reef as recited in claim 1 wherein anchors are provided on the shoreward and seaward ends of said arched wall to hold the reef in place on said ocean floor.

10. A method of preventing beach erosion comprising the steps of constructing a plurality of flat flexible wall sections, each section being constructed from a series of side-by-side transverse concrete blocks extending in a row generally perpendicular to the beach and interconnected by flexible means at adjacent lateral edges thereof, forming each of said wall sections into a similar arch shaped structure having a curved top portion and generally smooth upper outer surfaces, placing said arch shaped structures in side-by-side alignment on the ocean floor with said top portion of each structure beneath the surface of the water at low tide and high enough off of the ocean floor relative to the water surface to cause waves passing over it to break and with said transverse concrete blocks generally parallel to the shore line of the beach being protected from erosion, and securing adjacent arch shaped structures together in side-by-side relations with a shoreward wall section facing the beach and a seaward wall section facing out to sea to present a continuous submerged barrier in the path of waves moving toward the beach.

11. A method as recited in claim 10, anchoring said shoreward and seaward wall sections to the ocean floor to hold the barrier in place against tides where the sea water is moving toward and away from the beach.

12. An artificial ocean reef for use below the ocean surface to prevent beach erosion, said reef having a plurality of adjacent sections each of which comprises an arched wall formed by a series of side by side transverse concrete blocks having a space between each other, and flexible means interconnecting said blocks at adjacent lateral ends to provide a generally smooth outer surface, said flexible interconnecting means comprising a plurality of wire segments embedded in and spanning gaps between the lateral edges of adjacent blocks, spacers selectively disposed in at least one of said gaps and abutting said adjacent lateral edges of said blocks, and said wall having a shoreward side with a shoreward end resting on the floor of the ocean and a seaward side with a seaward end resting on the floor of the ocean outwardly from said shoreward end to present said generally smooth surface on said seaward side to the incoming waves.

13. An artificial ocean reef as set forth in claim 12 wherein said spacers have grooves cooperating with said wire segments to prevent lateral movement of said spacers relative to said blocks.

14. A method for preventing beach erosion comprising the steps of constructing a flat flexible wall section from a series of side-by-side transverse concrete blocks interconnected by flexible means at adjacent lateral edges, forming said wall into an arch shaped structure having a curved top portion and generally smooth outer surfaces by placing said flat flexible wall on an installation form having a generally arch shaped surface to which said wall conforms, securing said wall in said arch shape, lifting said wall from said installation form and placing said arch shaped structure on the ocean floor with the top portion beneath the surface of the water at low tide and with said transverse concrete blocks generally aligned with the shore line of the beach being protected from erosion to present a submerged barrier to the force components of waves traveling toward the shore.

15. An artificial ocean reef for use below the ocean surface to prevent beach erosion, said reef having at least one section comprising an arched wall formed by a series of side-by-side transverse concrete blocks, and flexible means for interconnecting said blocks at adjacent lateral edges to provide a generally smooth outer surface, said wall being generally bell-shaped in cross section, said transverse concrete blocks being spaced from each other and said flexible interconnecting means comprises a plurality of wire segments embedded in and spanning gaps between lateral edges of adjacent blocks, and spacers selectively disposed in a least one of said gaps, said spacers abutting said adjacent lateral edges of said blocks.

16. An artificial ocean reef as set forth in claim 15 wherein said spacers have grooves cooperating with said segments to prevent lateral movement of said spacers relative to said blocks.

\* \* \* \* \*